United States Patent
Rogers et al.

(10) Patent No.: US 10,922,648 B2
(45) Date of Patent: Feb. 16, 2021

(54) AUTOMATED ASSET MANAGEMENT SYSTEM WITH MULTIPLE SENSING TECHNOLOGIES

(71) Applicant: SNAP-ON INCORPORATED, Kenosha, WI (US)

(72) Inventors: Frederick J. Rogers, North Little Rock, AR (US); David C. Fly, Maumelle, AR (US); Preston C. Phillips, Conway, AR (US); Matthew J. Lipsey, Sherwood, AR (US); Joseph Chwan, Mechanicsburg, PA (US); Jason Newport, Conway, AR (US); Andrew R. Lobo, Wadsworth, IL (US)

(73) Assignee: SNAP-ON INCORPORATED, Kenosha, WI (US)

( * ) Notice: Subject to any disclaimer, the term of this patent is extended or adjusted under 35 U.S.C. 154(b) by 0 days.

(21) Appl. No.: 16/242,321

(22) Filed: Jan. 8, 2019

(65) Prior Publication Data

US 2019/0138981 A1 May 9, 2019

Related U.S. Application Data

(63) Continuation of application No. 15/681,964, filed on Aug. 21, 2017, now Pat. No. 10,192,197, which is a
(Continued)

(51) Int. Cl.
*G06Q 30/00* (2012.01)
*G06Q 10/08* (2012.01)
(Continued)

(52) U.S. Cl.
CPC .......... *G06Q 10/087* (2013.01); *B25H 3/028* (2013.01); *G06K 19/06037* (2013.01); *G06Q 10/08* (2013.01); *H04N 5/23229* (2013.01)

(58) Field of Classification Search
CPC ....... G06Q 10/087; G06Q 10/08; G06Q 10/06
(Continued)

(56) References Cited

U.S. PATENT DOCUMENTS

| 5,287,414 A | 2/1994 | Foster |
| 5,369,261 A | 11/1994 | Shamir |

(Continued)

FOREIGN PATENT DOCUMENTS

| CN | 101187557 A | 5/2008 |
| CN | 102858536 | 1/2013 |

(Continued)

OTHER PUBLICATIONS

Chinese Decision of Reexamination issued in Application No. 200980137705.5 dated Nov. 10, 2015, with partial English translation.
(Continued)

*Primary Examiner* — Ahshik Kim
(74) *Attorney, Agent, or Firm* — McDermott Will & Emery LLP

(57) ABSTRACT

An automated asset management system includes a plurality of storage locations for storing objects, and first and second sensing subsystems each configured to sense presence or absence of the objects in the plurality of storage locations. The first and second sensing subsystems are used to sense the presence or absence of a same particular object using different respective sensing modalities. In operation, a first scan of the storage locations is performed using the first sensing subsystem, and the presence or absence of the particular object is determined using the first sensing modality. In turn, a second scan of the storage locations is performed using the second sensing subsystem, and the presence or absence of the particular object is confirmed using both the result of the determination made using the
(Continued)

first sensing modality and a determination of the presence or absence of the particular object using the second sensing modality.

14 Claims, 7 Drawing Sheets

Related U.S. Application Data continuation of application No. 15/097,802, filed on Apr. 13, 2016, now Pat. No. 9,741,014.

(60) Provisional application No. 62/147,891, filed on Apr. 15, 2015.

(51) Int. Cl.
    *B25H 3/02*           (2006.01)
    *G06K 19/06*         (2006.01)
    *H04N 5/232*        (2006.01)

(58) Field of Classification Search
    USPC ........................................................ 235/385
    See application file for complete search history.

(56) References Cited

U.S. PATENT DOCUMENTS

| | | | |
|---|---|---|---|
| 5,546,156 | A | 8/1996 | McIntyre |
| 5,725,096 | A | 3/1998 | Winnard |
| 5,821,993 | A | 10/1998 | Robinson |
| 5,931,781 | A | 8/1999 | De Boer |
| 6,109,774 | A | 8/2000 | Holmes et al. |
| 6,510,522 | B1 | 1/2003 | Heinrich et al. |
| 6,707,381 | B1 | 3/2004 | Maloney |
| 6,816,625 | B2 | 11/2004 | Lewis, Jr. et al. |
| 6,827,275 | B2 | 12/2004 | Allen |
| 6,840,451 | B2 | 1/2005 | Allen |
| 6,989,749 | B2 | 1/2006 | Mohr |
| 7,256,682 | B2 | 8/2007 | Sweeney, II |
| 7,290,707 | B2 | 11/2007 | Sawasaki |
| 7,317,393 | B2 | 1/2008 | Maloney |
| 7,336,174 | B1 | 2/2008 | Maloney |
| 7,920,722 | B2 | 4/2011 | Mita et al. |
| 7,965,190 | B2 | 6/2011 | Maloney |
| 8,020,768 | B2 | 9/2011 | Ramos-Elizondo et al. |
| 8,199,246 | B2 | 6/2012 | Ono |
| 9,041,508 | B2 | 5/2015 | Glickman et al. |
| 9,122,999 | B2 | 9/2015 | Jackson et al. |
| 2002/0143672 | A1 | 10/2002 | Sawasaki |
| 2003/0001466 | A1 | 1/2003 | Herrington |
| 2003/0095710 | A1 | 5/2003 | Tessadro |
| 2004/0113786 | A1 | 6/2004 | Maloney |
| 2004/0190092 | A1 | 9/2004 | Silverbrook et al. |
| 2004/0207512 | A1 | 10/2004 | Bastian |
| 2005/0086514 | A1 | 4/2005 | Han et al. |
| 2007/0023193 | A1 | 2/2007 | King |
| 2007/0067203 | A1 | 3/2007 | Gil et al. |
| 2007/0135965 | A1 | 6/2007 | Nguyen et al. |
| 2008/0029159 | A1 | 2/2008 | Lee et al. |
| 2008/0059338 | A1 | 3/2008 | Hubbard |
| 2008/0088454 | A1 | 4/2008 | Flores et al. |
| 2009/0060349 | A1 | 3/2009 | Linaker et al. |
| 2009/0063306 | A1 | 3/2009 | Fano et al. |
| 2009/0072029 | A1 | 3/2009 | Martin |
| 2009/0231483 | A1 | 9/2009 | Seddik et al. |
| 2010/0045423 | A1 | 2/2010 | Glickman et al. |
| 2011/0248848 | A1 | 10/2011 | Reeves et al. |
| 2013/0328661 | A1 | 12/2013 | Phillips et al. |
| 2013/0332323 | A1 | 12/2013 | Phillips et al. |
| 2013/0346261 | A1 | 12/2013 | Phillips et al. |
| 2014/0025543 | A1 | 1/2014 | Phillips et al. |
| 2014/0350716 | A1 | 11/2014 | Fly et al. |
| 2014/0348740 | A1 | 12/2014 | Lipsey et al. |
| 2015/0201166 | A1 | 7/2015 | Glickman et al. |
| 2016/0078704 | A1 | 3/2016 | Phillips et al. |

FOREIGN PATENT DOCUMENTS

| | | | |
|---|---|---|---|
| EP | 0 363 350 | A1 | 4/1990 |
| EP | 0604441 | A1 | 7/1994 |
| EP | 1030521 | A1 | 8/2000 |
| EP | 1335586 | A2 | 8/2003 |
| EP | 1 783 570 | A1 | 5/2007 |
| EP | 1860041 | A1 | 11/2007 |
| EP | 2014424 | A1 | 1/2009 |
| JP | 0868613 | A | 3/1996 |
| JP | 2001-294308 | A | 10/2001 |
| JP | 2003-090661 | A | 3/2003 |
| JP | 2006-103852 | A | 4/2006 |
| WO | 1995/027252 | A1 | 10/1995 |
| WO | 01/09820 | A2 | 2/2001 |
| WO | 02/13136 | A2 | 2/2002 |
| WO | 2006106509 | A2 | 10/2006 |
| WO | 2007/118272 | A1 | 10/2007 |
| WO | 2008/029159 | A1 | 3/2008 |
| WO | 2008/112731 | A2 | 9/2008 |
| WO | 2009/024751 | A1 | 2/2009 |
| WO | 2010/017530 | A2 | 2/2010 |
| WO | 2014/189972 | A1 | 11/2014 |

OTHER PUBLICATIONS

Chinese Decision of Reexamination issued in Application No. 200980140152.9 dated Jan. 7, 2016, with English translation.
U.S. Office Action issued in U.S. Appl. No. 14/812,955 dated Sep. 15, 2015.
Chinese Office Action issued in Chines Application No. 200980137855.6 dated Jun. 5, 2014, with English Translation.
Chinese Office Action issued in Chinese Application No. 200980140152.9 dated Apr. 10, 2014, with English Translation.
United States Office Action issued in U.S. Appl. No. 13/741,207 dated Jun. 14, 2013.
Notification Concerning Transmittal of International Preliminary Report on Patentability issued in International Application No. PCT/US2009/053227 dated Aug. 8, 2013.
European Office Action issued in Application No. 09805639.3 dated Feb. 10, 2015.
U.S. Office Action issued in U.S. Appl. No. 12/484,127 dated Mar. 28, 2014.
Chinese Office Action issued in Chinese Application No. 200980140153.3 dated Feb. 26, 2014, w/English translation.
Chinese Office Action issued in Chinese Application No. 200980140153.3 dated Apr. 25, 2014, w/English translation.
European Office Action issued in European Application No. 09 805 642.7-1955 dated Jul. 4, 2013.
European Office Action issued in European Application No. 09 805 644.3-1955 dated Jul. 3, 2013.
Chinese Office Action issued in Chinese Application No. 200980137705.5 dated Jun. 7, 2013, w/English translation.
European Extended Search Report issued in European Application No. 09805639.3-1955 dated Apr. 16, 2014.
Chinese Office Action issued in Chinese Application No. 200980140152.9 dated Sep. 3, 2013, w/English translation.
Chinese Office Action issued in Chinese Application No. 200980140152.9 dated Apr. 10, 2014, w/English translation.
Chinese Office Action issued in Chinese Application No. 200980140152.9 dated Sep. 30, 2014, w/English translation.
U.S. Office Action issued in U.S. Appl. No. 13/741,207 dated Jul. 14, 2014.
Notification of Transmittal of the International Search Report and the Written Opinion of the International Searching Authority issued in International Application No. PCT/US2009/053227 dated Jul. 23, 2013.
Office Action issued in Chinese Patent Application No. 200980137705.5 dated Feb. 5, 2013.
Chinese Office Action for Application No. 200980137855.6 dated Apr. 11, 2013.
Extended European Search Report issued in European Patent Application No. 09805642.7, dated Sep. 19, 2011.

(56) References Cited

OTHER PUBLICATIONS

Extended European Search Report issued in European Patent Application No. 09805641.9 dated Oct. 19, 2012.
International Search Report and Written Opinion issue in International Patent Application No. PCT/US2009/053232, dated Nov. 1, 2010.
Extended European Search Report issued in European Patent Application No. 09805644.3, dated Sep. 19, 2011.
International Search Report and Written Opinion issued in International Patent Application No. PCT/US2009/053229, dated Oct. 20, 2011.
U.S. Office Action issued in U.S. Appl. No. 12/523,100, dated Sep. 28, 2011.
International Search Report issued in International Patent Application No. PCT/US2009/053230 dated Dec. 1, 2010.
Worksmart Systems, Inc.—Foreign Object Damage (FOD) Tool Control Cabinet (www.worksmartsystems.com), 2 pgs., 2006.
United States Office Action issued in U.S. Appl. No. 12/484,139 dated Dec. 30, 2013.
Chinese Office Action, w/ English translation thereof, issued in Chinese Patent Application No. CN 200980140153.3 dated Oct. 23, 2013.
Chinese Office Action with English translation issued in Chinese Application No. 200980137855.6 dated Nov. 29, 2013.
U.S. Office Action issued in U.S. Appl. No. 12/484,127, dated Feb. 16, 2012.
U.S. Office Action issued in U.S. Appl. No. 12/484,139, dated Jan. 19, 2012.
Chinese Office Action with English translation issued in CN Application No. 200980140153.3 dated May 16, 2012.
U.S. Office Action dated Jun. 5, 2012 by the US Patent Office issued in related U.S. Appl. No. 12/538,100.
Chinese Office Action, and English translation thereof, issued in Chinese Patent Application No. 2009801377055 dated Apr. 28, 2012.
International Search Report and Written Opinion dated Jun. 20, 2016, issued in International Application No. PCT/US2016/025985.
International Preliminary Report on Patentability for International Application No. PCT/US2016/025985, dated Oct. 26, 2017.
Non-Final Office Action issued in U.S. Appl. No. 15/097,802, dated Nov. 18, 2016.
Notice of Allowance issued in U.S. Appl. No. 15/097,802, dated Jul. 18, 2017.
Chinese Office Action issued in Chinese Application No. 200980140152.9, dated Apr. 3, 2015.
Notice of Allowance dated May 6, 2015, issued in U.S. Appl. No. 13/741,207, dated May 6, 2015.
Chinese Office Action dated Jan. 13, 2014 issued in Chinese Application 200980137705.5 (English translation).
Non-Final Office Action issued in U.S. Appl. No. 15/681,964, dated Feb. 23, 2018.
Notice of Allowance issued in U.S. Appl. No. 15/681,964, dated Sep. 18, 2018.
Chinese Office Action for Chinese Application No. 201680010130.0, dated Mar. 11, 2020 with English translation, 19 pages.

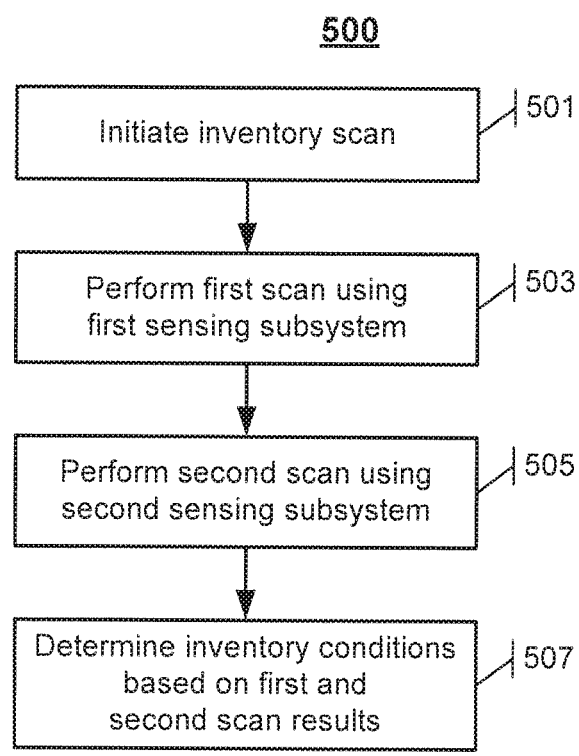

AUTOMATED ASSET MANAGEMENT SYSTEM WITH MULTIPLE SENSING TECHNOLOGIES

CROSS-REFERENCE TO RELATED APPLICATION

This application is a continuation of U.S. patent application Ser. No. 15/681,964, filed on Aug. 21, 2017, which is a continuation of U.S. patent application Ser. No. 15/097,802, filed on Apr. 13, 2016, now U.S. Pat. No. 9,741,014, which claims the benefit of U.S. Provisional Patent Application No. 62/147,891, filed in the U.S. Patent and Trademark Office on Apr. 15, 2015, the disclosures of each are incorporated by reference herein in their entirety.

TECHNICAL FIELD

The present subject matter relates to automated tool control systems, and to techniques and equipment to automatically track tools stored in automated tool control systems using multiple sensing technologies.

BACKGROUND

When tools are used in a manufacturing or service environment, it is important that tools be returned to a storage unit, such as a tool box, after use. Some industries have high standards for inventory control of tools, for example to prevent incidents of leaving tools in the workplace environment where they could cause severe damages. In the aerospace industry, for instance, it is important to ensure that no tools are accidentally left behind in an aircraft or missile being manufactured, assembled, or repaired in order to prevent foreign object damage (FOD) to the aircraft.

Some toolboxes include built-in inventory determination features to track inventory conditions of tools stored in those toolboxes. For example, some toolboxes dispose contact sensors, magnetic sensors, or infrared sensors in or next to each tool storage location to detect whether a tool is placed in the tool storage location. Based on signals generated by the sensors, the toolboxes are able to determine whether any tool is missing.

The different types of sensors used in toolboxes each have distinct advantages and disadvantages, and different associated costs. For example, certain sensors may provide real-time or near-instantaneous information on the status of a tool upon the tool being placed in the toolbox, while other sensors may have associated delays. Certain sensors may not differentiate between a tool and another object having a similar weight, shape, or other sensed attribute, and may therefore not differentiate between the tool and the other object being present in the toolbox. Other sensors may not differentiate between multiple similar tools, and may therefore not be able to determine whether a tool returned by one user into the toolbox was the same tool borrowed by the user or another similar tool borrowed by another user.

A need therefore exists for automated asset management systems that leverage the advantages of multiple different sensing technologies within a same system—and with regard to a same tool—to provide more precise and more efficient automated asset management.

SUMMARY

The teachings herein improve the efficiency and tracking capability of asset management systems to automatically track objects stored therein by concurrently using multiple sensing technologies.

In accordance with one aspect of the disclosure, an automated asset management system includes a plurality of storage locations for storing objects, first and second sensing subsystems each configured to sense presence or absence of the objects in the plurality of storage locations of the asset management system, a processor, and a non-transitory machine readable recording medium storing program instructions. The first and second sensing subsystems are configured to sense the presence or absence of a same particular object in the asset management system using different respective first and second sensing modalities. The program instructions, when executed by the processor, cause the processor to perform a scan of the storage locations using the first sensing subsystem, and determine the presence or absence of the particular object in the plurality of storage locations using the first sensing modality of the first sensing subsystem. The program instructions further cause the processor to perform a scan of the storage locations using the second sensing subsystem, and confirm the presence or absence of the particular object in the plurality of storage locations using both the result of the determination made using the first sensing modality and a determination of the presence or absence of the particular object using the second sensing modality of the second sending subsystem.

The second sensing subsystem may be further configured to read unique identifiers from objects present in the asset management system. In one example, the second sensing subsystem may be configured to read unique identifiers stored in radio frequency (RF) identification (RFID) tags associated with objects present in the asset management system. In another example, the second sensing subsystem may be configured to read unique identifiers stored in bar-code or quick response (QR) code tags associated with objects present in the asset management system. In the other example, the first sensing subsystem may be a camera-based image sensing subsystem including one or more cameras, the second sensing subsystem may be a tag sensing subsystem for sensing bar-code or quick response (QR) code tags associated with objects in the asset management system, and the first and second sensing subsystems may use the same one or more cameras for performing scans of the storage locations using the first and second sensing modalities.

The first sensing subsystem may be a camera-based image sensing subsystem including one or more cameras, and may be configured to determine the presence or absence of a particular tool using a camera-based visual sensing modality by capturing an image of a storage location associated with the particular tool and determining whether the tool is present in the captured image. The second sensing subsystem may be a radio frequency (RF)-based sensing subsystem including one or more RF identification (RFID) transceivers, and may be configured to determine the presence or absence of the particular tool using an RF-based wireless sensing modality used to sense whether an RF-based tag associated with the particular tool is present in the asset management system. The processor may be configured to determine a total number of RF-based tags that are expected to be present in the asset management system using the first sensing modality, and perform the scan of the storage locations using the RF-based sensing subsystem to identify the determined total number of RF-based tags in the asset management system. The RF-based sensing subsystem may be used to confirm the presence or absence of the particular object using both the result of the determination made by the camera-based visual sensing modality and the RF-based wireless sensing modality.

In accordance with a further aspect of the disclosure, a method includes performing, using a first sensing subsystem, a first scan of a plurality of storage locations for storing objects in an automated asset management system having the first sensing subsystem and a second sensing subsystem each configured to sense presence or absence of the objects in the plurality of storage locations. Presence or absence of a particular object in the plurality of storage locations is determined based on a result of the first scan using a first sensing modality of the first sensing subsystem. A second scan of the plurality of storage locations is performed using the second sensing subsystem. In turn, the presence or absence of the particular object in the plurality of storage locations is confirmed using both a result of the determination made using the first sensing modality and a determination of the presence or absence of the particular object using a second sensing modality of the second sending subsystem. The first and second sensing subsystems are configured to sense the presence or absence of a same particular object in the asset management system using different respective first and second sensing modalities.

The performing of the second scan can include reading, using the second sensing subsystem, unique identifiers from objects present in the asset management system. In one example, the performing of the second scan can include reading, using the second sensing subsystem, unique identifiers stored in radio frequency (RF) identification (RFID) tags associated with objects present in the asset management system. In another example, the performing of the second scan can include reading, using the second sensing subsystem, unique identifiers stored in bar-code or quick response (QR) code tags associated with objects present in the asset management system. In the other example, the first sensing subsystem may be a camera-based image sensing subsystem including one or more cameras, the second sensing subsystem may be a tag sensing subsystem for sensing bar-code or quick response (QR) code tags associated with objects in the asset management system, and the first and second sensing subsystems may use the same one or more cameras for performing the first and second scans of the storage locations using the first and second sensing modalities.

The first sensing subsystem may be a camera-based image sensing subsystem including one or more cameras, the performing the first scan may include capturing an image of a storage location associated with the particular object, and the determining the presence or absence of the particular object based on the result of the first scan may include determining whether the object is present in the captured image. The second sensing subsystem may be a radio frequency (RF)-based sensing subsystem including one or more RF identification (RFID) transceivers, the performing the second scan may include sensing whether an RF-based tag associated with the particular object is present in the asset management system, and confirming the presence or absence of the particular object is based on the sensing whether the RF-based tag associated with the particular object is present in the asset management system. The method may further include determining a total number of RF-based tags that are expected to be present in the asset management system based on the result of the first scan, where the performing of the second scan of the storage locations includes using the RF-based sensing subsystem to identify the determined total number of RF-based tags in the asset management system. The confirming the presence or absence of the particular object may include using both the result of the determination made by a camera-based visual sensing modality and a RF-based wireless sensing modality.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 is a functional flow diagram showing steps of a method for performing an inventory of objects using multiple sensing technologies in an automated asset management system.

DETAILED DESCRIPTION

Figure 1A:
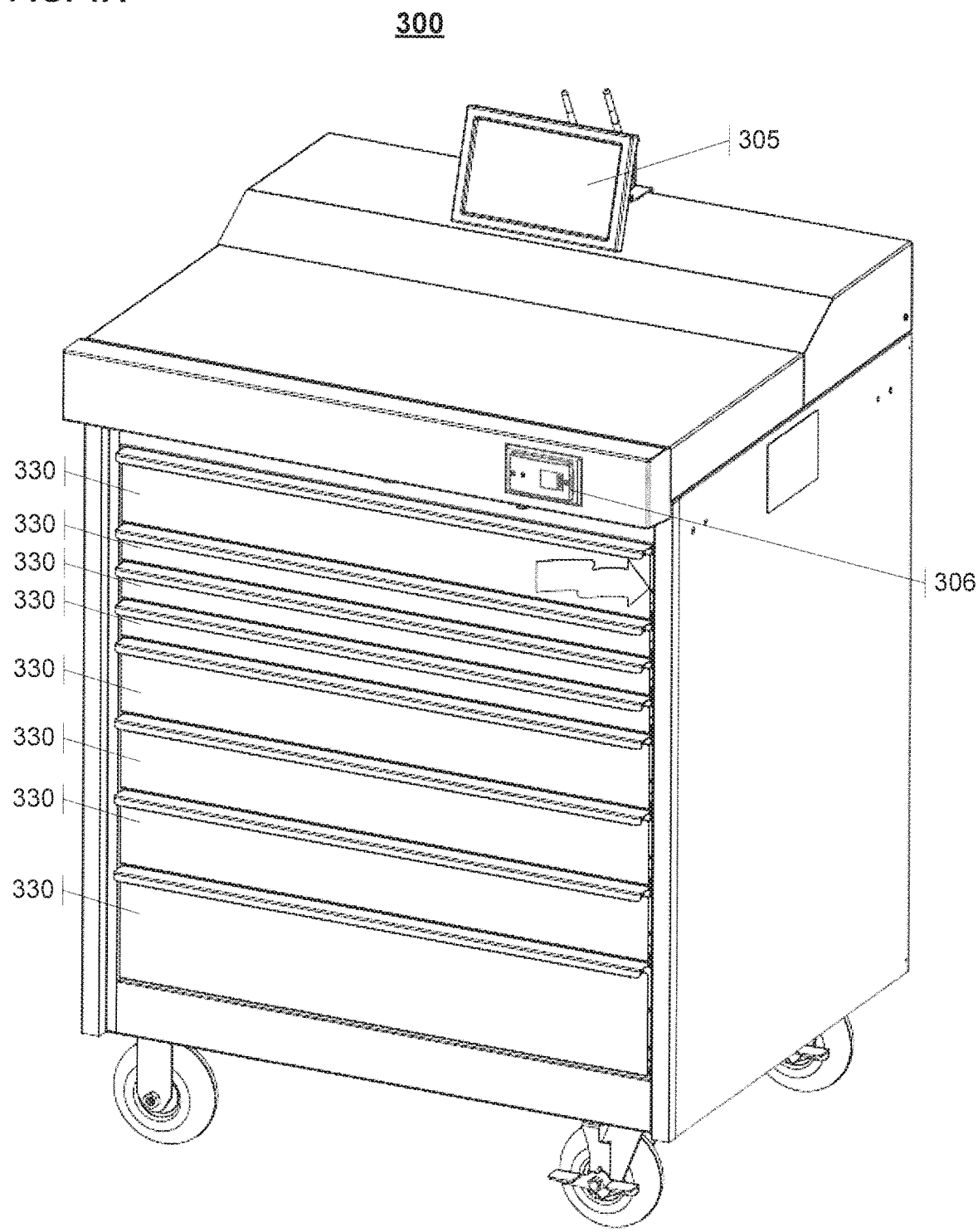
FIGS. 1A-1C show various illustrative automated asset management systems in the form of tool storage systems.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to the use of multiple sensing technologies within an automated asset management system. More particularly, the various systems and methods disclosed herein relate to the use of several different sensing technologies in an automated asset management system to independently sense the presence (and/or other attributes) of a particular tool (or multiple particular tools)—and to thereby provide improved efficiency and accuracy, track additional information, and provide additional functionality to the automated asset management system.

For example, an automated asset management system such as a toolbox may use both camera-based and radio-frequency (RF) based sensing technologies to sense the presence and/or other attributes of a particular tool (or of multiple tools). The camera-based sensing may provide an instantaneous (or near-instantaneous) indication of whether the particular tool is present in or absent from the system. The RF-based sensing may enable the system to differentiate between multiple tools that are identical (or not differentiated) to the camera-based sensing (e.g., similar torque wrenches), for example by distinguishing between the tools' serial numbers (or other unique identifiers) or other unique tool identifiers encoded in a RF-based tag. Further, the automated asset management system may be configured to more efficiently perform RF-based sensing by leveraging the combined use of the camera-based and RF-based sensing modalities as described in more detail below.

In another example, the automated asset management system may use both image-based and bar-code based sensing to sense the presence and/or other attributes of tools. As in the example described in the previous paragraph, the camera-based sensing may provide an indication of whether particular tools are present in or absent from the system. The bar-code based sensing may enable the system to differentiate between tools that are indistinguishable using the image-based analysis, for example by distinguishing between serial numbers or other unique identifiers encoded in bar-codes affixed to the tools. The image-based and bar-code based sensing may be performed using a same camera (or multi-camera system), or using distinct sensors (e.g., a first set of camera sensors used for image-based sensing, and a second set of bar-code scanners used for bar-code sensing).

Reference now is made in detail to the examples illustrated in the accompanying drawings and discussed below.

Figure 1B:
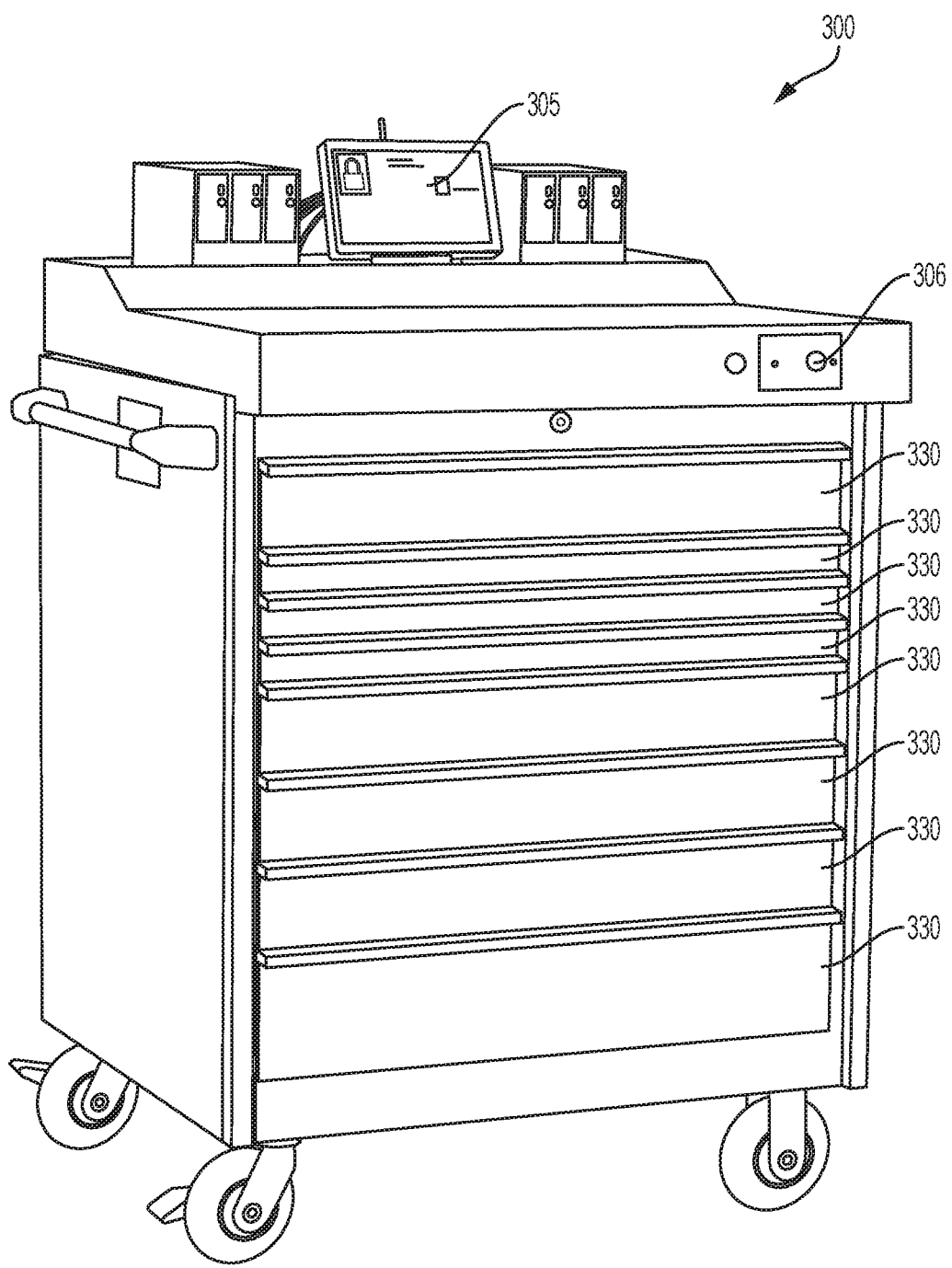
Figure 1C:
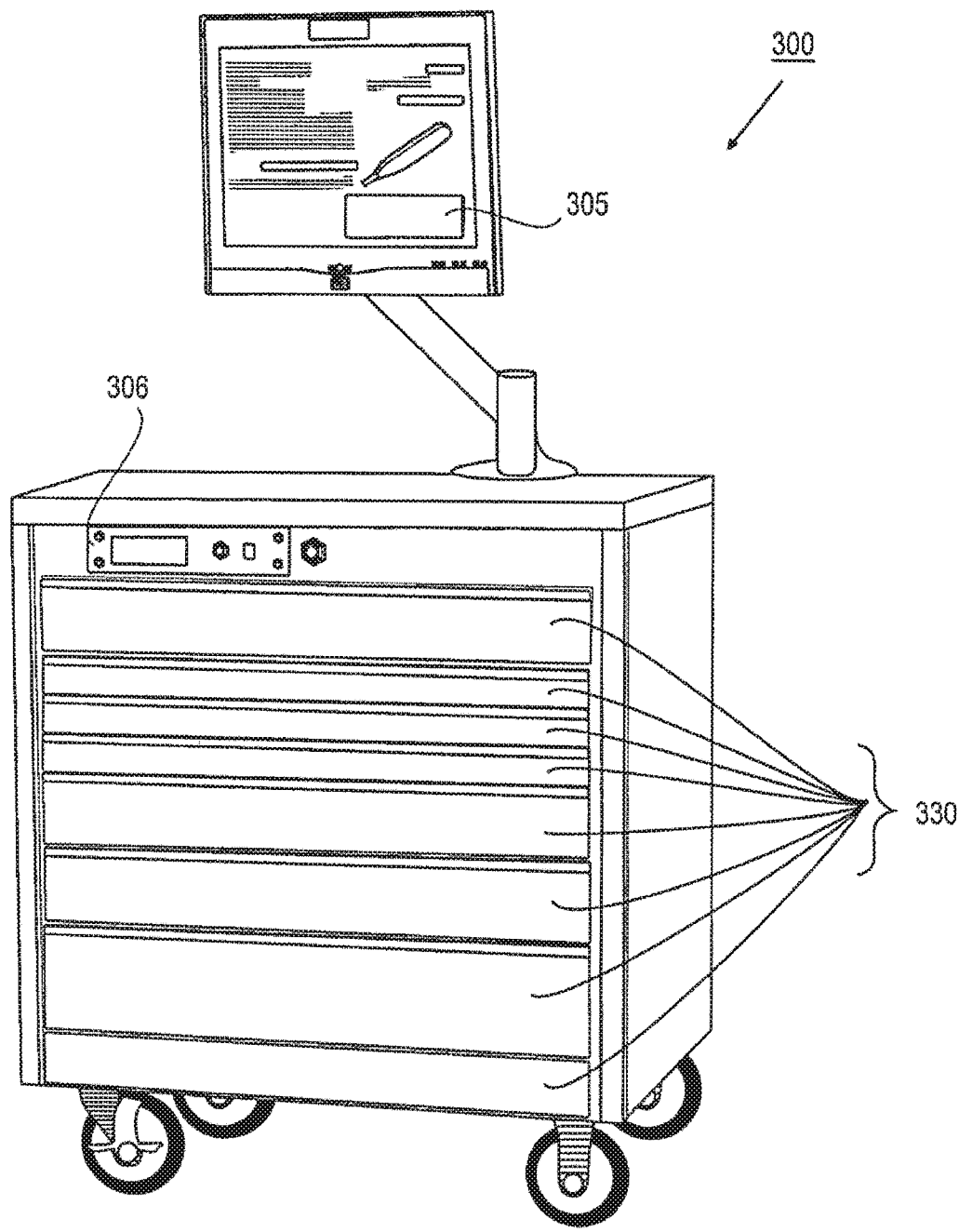

FIGS. 1A-1C show various illustrative automated asset management systems (or inventory control systems) in the form of a tool storage system 300. While the tool storage systems 300 shown in FIGS. 1A-1C are toolboxes, the tool storage systems 300 may more generally be tool lockers or any other secure storage devices or enclosed secure storage areas (e.g., a tool crib or walk-in tool locker).

Each tool storage system 300 is an example of a highly automated inventory control system that utilizes multiple different sensing technologies for identifying inventory conditions of objects in the storage unit. In one example, the tool storage system 300 uses machine imaging and RF sensing methodologies for identifying inventory conditions of objects in the storage unit.

Illustrative features include the ability to process complex image data with efficient utilization of system resources, autonomous image and camera calibrations, identification of characteristics of tools from image data, adaptive timing for capturing inventory images, efficient generation of reference data for checking inventory status, autonomous compensation of image quality, etc. Further features include the ability to emit and receive RF sensing signals such as RF identification (RFID) signals, to process the received signals to identify particular tools, and to cross-reference tool information obtained through the multiple different sensing modalities (e.g., camera and RFID based modalities) to provide advanced features. More detailed information on the tool storage system 300 can be found in U.S. application Ser. No. 12/484,127, entitled IMAGE-BASED INVENTORY CONTROL SYSTEM AND METHOD and filed on Jun. 12, 2009, now patented as issued as U.S. Pat. No. 9,041,508 issued May 26, 2015, which is hereby incorporated by reference in its entirety.

As shown in each of FIGS. 1A-1C, the tool storage system 300 includes a user interface 305, an access control device 306, such as a card reader, for verifying identity and authorization levels of a user intending to access storage system 300, and multiple tool storage drawers 330 for storing tools. Instead of drawers 330, the storage system may include shelves, compartments, trays, containers, or other object storage devices from which tools or objects are issued and/or returned, or which contain the storage device from which the objects are issued and/or returned. In further examples, the storage system includes storage hooks, hangers, tool boxes with drawers, lockers, cabinets with shelves and/or doors, safes, boxes, closets, vending machines, barrels, crates, and other material storage means.

User interface 305 is an input and/or output device of storage system 330, configured to display information to a user. Access control device 306 is used to limit or allow access to tool storage drawers 330. Access control device 306, through the use of one or more electronically controlled locking devices or mechanisms, keeps some or all storage drawers 330 locked in a closed position until access control device 306 authenticates a user's authorization for accessing storage system 300. The access control device 306 further includes a processor and software to electronically identify a user requesting access to the secure area or object storage device and determine the level of access which should be granted or denied to the identified user. If access control device 306 determines that a user is authorized to access storage system 300, it unlocks some or all storage drawers 330, depending on the user's authorization level, allowing the user to remove or replace tools. In particular, the access control device 306 may identify predetermined authorized access levels to the system (e.g., a full access level providing access to all drawers 330, a partial access level providing access only to particular drawer(s) 330, or the like), and allow or deny physical access by the user to the three dimensional space or object storage devices based on those predetermined authorized levels of access.

Tool storage system 300 includes several different sensing subsystems. In an illustrative example, the tool storage system 300 includes a first sensing subsystem in the form of an image sensing subsystem configured to capture images of contents or storage locations of the system. The image sensing subsystem may include one or more lens-based cameras, CCD cameras, CMOS cameras, video cameras, or other types of devices that captures images. The tool storage system 300 further includes a second sensing subsystem that, in one example, takes the form of an RFID sensing subsystem including one or more RFID antennas, RFID transceivers, and RFID processors. The RFID sensing subsystem is configured to emit RF sensing signals when an RF-based scan of the storage system 300 is performed, receive RFID signals returned from RFID tags mounted on or incorporated in tools or other inventory items in response to the emitting the RF sensing signals, and process the received RFID signals to identify individual tools or inventory items.

The image sensing subsystem is described in further detail below in relation to FIG. 3. While FIG. 3 corresponds to the specific embodiment of the storage system 300 shown in FIG. 1C, the teachings illustrated in FIG. 3 can be applied to each of the embodiments of FIGS. 1A-1C and to other types of automated asset management systems. The RFID sensing subsystem may be configured to sense RFID tags of tools located in all storage drawers 330 of system 300, or configured to sense RFID tags of tools located in a particular subset of the drawers 330 of system 300. In one example, the RFID sensing subsystem is configured to sense RFID tags of tools located only in the top-most and bottom-most drawers 330 of system 300, and the RFID sensing subsystem includes RFID antennas disposed directly above the top-most and bottom-most drawers 330 within system 300 to sense RFID tags of tools located in those drawers. Other configurations of RFID antennas can also be used.

Figure 2A:
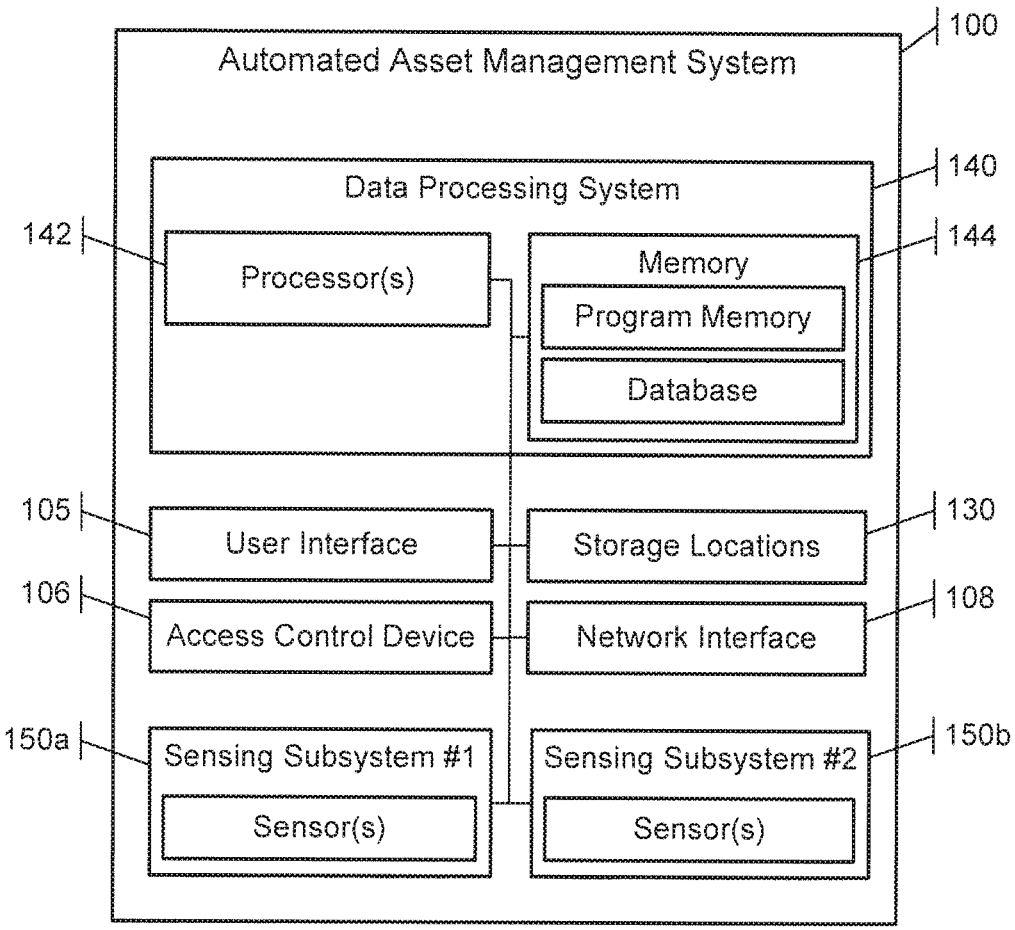
FIGS. 2A and 2B are high-level functional block diagrams of an automated asset management system and of sensing subsystems thereof.

FIG. 2A is a block diagram showing components of an automated asset management system 100, such as tool storage system 300. As shown in FIG. 2A, and similarly to tool storage system 300, automated asset management system 100 includes storage locations 130, a user interface 105, an access control device 106, and a network interface 108. The storage locations 130 may include one or more storage drawers 330, shelves, cabinet doors, or the like. The user interface 105 may include one or more user input/output devices, such as a display (e.g., a touch-sensitive display), a keyboard, a mouse or touchpad, a speaker and/or microphone, or the like. The access control device 106 may include one or more of a card reader (e.g., identification card reader), an iris scanner, a locking mechanism, an alarm, or the like. The network interface 108 enables the system 100 to communicate across one or more wired or wireless networks with other network automated asset management systems, other tool storage systems (e.g., 300), or an asset management server that may be used to monitor the operation of and inventory status of multiple tool storage systems.

Automated asset management system 100 further includes a data processing system 140, such as a computer, for processing sensing data received from various sensing subsystems 150*a* and 150*b* (reference generically as sensing subsystem(s) 150) and determining inventory conditions based on the sensing data. In one example, the data processing system 140 processes images captured by an image sensing device of the sensing subsystem 150, for processing RFID signals captured by the RFID antennas and transceivers of the sensing subsystem 150, and/or for processing other sensing signals received by other sensing subsystems 150. The data processing system 140 includes one or more processors 142 (e.g., micro-processors) and memory 144. The memory 144 includes a program memory storing program instructions for causing the automated asset management system 100 to perform inventory control functions. The memory 144 includes a database of tool information, which may include tool identifiers, tool images, tool tag information (e.g., for RFID or bar-code tags), tool inventory status, and the like. The program instructions further cause the system 100 to communicate electronically directly or through a network with sensing devices (e.g., 150) and obtain data from sensing devices relative to the presence or absence data of objects within the three dimensional space or object storage device. Images, RFID signals, and other sensing signals captured or received by the sensing subsystems 150 are processed by the data processing system 140 for determining an inventory condition of the system 100 and/or of each storage drawer (e.g., 130).

The system 100 includes two or more sensing subsystems 150*a* and 150*b*. Each sensing subsystem relies on one or more sensor(s) to determine the presence or absence of objects in the system 100. In one example, a first sensing subsystem (e.g., 150*a*) includes one or more cameras (or other image sensors), while a second sensing subsystem (e.g., 150*b*) includes one or more RFID transceivers (or other RF sensors). In another example, a first image-based sensing subsystem and a second bar-code-based sensing subsystem use respective sensors (e.g., camera(s) and bar-code scanners, respectively). In a further example, the first image-based sensing subsystem and the second bar-code-based sensing subsystem use same sensors (e.g., one or more camera(s)). In each example, the data processing system 140 processes sensing data obtained from the sensor(s) in order to determine inventory conditions of the automated asset management system 100.

The components of the automated asset management system 100 of FIG. 2A are communicatively connected with each other, for example via a communication bus or other communication links. The data processing system 140 functions as a central processing unit (CPU) for executing program instructions, such as program instructions stored in a non-transitory machine readable storage medium (e.g., memory 144), for controlling the operation of the asset management system 100. Additionally, each of the sensing subsystems (e.g., 150) can include microprocessors operative to execute program instructions and perform functions relating to sensing operations. The automated asset management system 100 can also be in communication, via network interface 108, with wired and/or wireless local area and/or wide area networks (e.g., the Internet). The automated asset management system 100 may communicate with other asset management systems and/or servers across the network(s), and may exchange information on inventory conditions, stored objects, and operation data with those systems and/or servers.

Figure 2B:
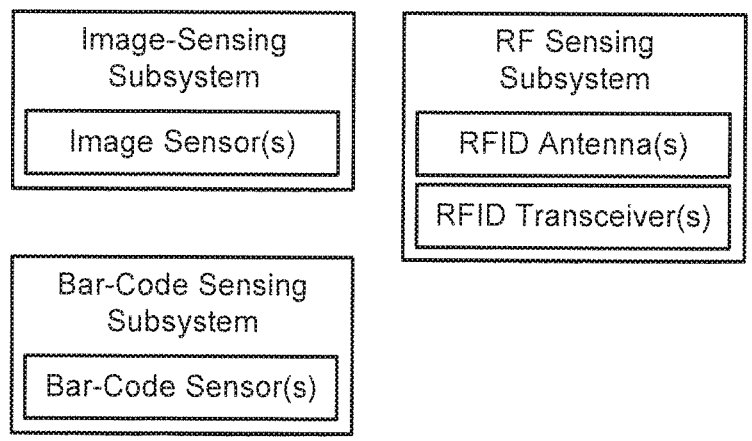

Various examples of sensing subsystems are shown in FIG. 2B. For example, an image-sensing subsystem may include one or more image sensor(s), such as lens-based cameras, CCD cameras, CMOS cameras, video cameras, or other types of devices that captures images. In examples including multiple cameras, the cameras may have different fields of view that may overlap with each other at the margins. For example, different cameras may have fields of view covering different drawers 330, and/or fields of view covering different portions of a same drawer 330. In operation, the image-sensing subsystem may rely on images of the drawers 330 and/or objects stored in memory 144 to determine inventory conditions.

A bar-code sensing subsystem may include one or more bar-code sensor(s), such as sensors for scanning uni-dimensional (1D) bar-codes, multi-dimensional (e.g., 2D) bar-codes, and/or quick response (QR) codes. The bar-code sensor(s) can be image sensor(s) (e.g., the same image sensor(s) used by an image-sensing subsystem used in the system 100), bar-code scanners (e.g., a bar-code scanner that emits light), or the like. In some examples, multiple bar-code scanners are used, for example different bar-code scanners for different drawers 330, different bar-code scanners for scanning different portions of a drawer 330, or the like. In operation, the bar-code sensing subsystem may rely on a database stored in memory 144 that associates bar-codes with objects to determine inventory conditions.

An RF sensing subsystem may include one or more RFID antenna(s) and RFID transceiver(s). RFID antenna(s) (and transceiver(s)) may be located at various locations within the system 100 in order to detect RFID tags within each antenna's vicinity. For example, an RF sensing subsystem may include one or more RFID antennas located in each drawer 330 or positioned to be directly above each drawer 330 when the drawer is closed. The RF sensing subsystem may include RFID antennas and transceivers only in (or proximate to) drawers 330 that are configured to store objects equipped with RFID tags, such as only in (or proximate to) an uppermost and a lowermost drawer 330 of a tool storage system 300. In operation, the RF sensing subsystem may rely on a database stored in memory 144 that associates RFID tag numbers with objects to determine inventory conditions.

The term inventory condition as used throughout this disclosure means information relating to an existence/presence or non-existence/absence condition of objects in the storage system.

The data processing system 140 may be part of and located within a tool storage system 300. Alternatively, the data processing system 140 can be a remote computer having a data link, such as a wired or wireless link, coupled to tool storage system 300, or a combination of a computer integrated in storage system 300 and a computer remote from storage system 300. Additionally, the data processing system 140 can be connected to a computer network and exchange data with an administrative software application (e.g., as may be executed on a server) used to manipulate and store data and store and display information relative to the data to system users.

Figure 3:
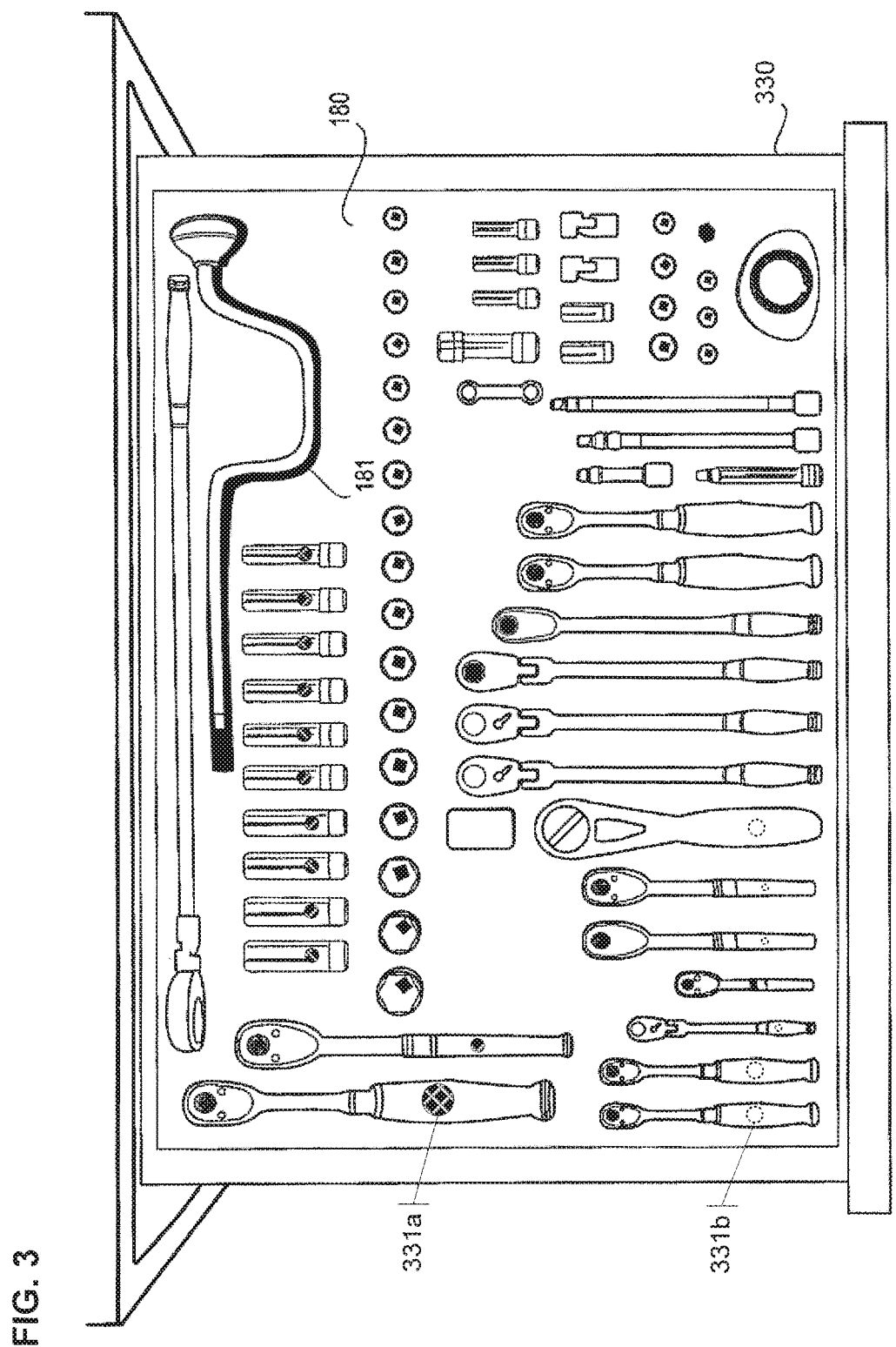
FIG. 3 shows an opened drawer of an automated asset management system like those shown in FIGS. 1A-1C.

FIG. 3 shows a detailed view of one illustrative drawer 330 of the storage system 300 in an open position. The storage drawer 330 includes a foam base 180 having a plurality of storage locations, such as tool cutouts 181, for storing tools. Each cutout is specifically contoured and shaped for fittingly receiving a tool with a corresponding shape. Tools may be secured in each storage location by using hooks, Velcro, latches, pressure from the foam, etc.

In general, each storage drawer 330 includes multiple storage locations for storing various types of tools. As used throughout this disclosure, a storage location is a location in a storage system for storing or securing objects. In some embodiments, each tool has a specific pre-designated storage location in the tool storage system. In other embodiments, multiple storage locations may have similar (or identical) shapes, and several similarly shaped tools may thus be placed in any of the multiple storage locations.

As shown in FIG. 3, one or more tools in the drawer 330 may have identification tags 331a and 331b mounted or attached thereon or therein. The identification tags may be RFID tags, bar-code tags, or the like. In the case of RFID tags, the RFID tags may be placed on a surface of the tools and may thus be visible to users, such as tag 331a, or the RFID tags may be placed within the tool or may otherwise not be visible to users, such as tag 331b. In general, bar-code tags would be placed on a surface of the tools, such as tag 331a.

While only some tools are shown in FIG. 3 as having identification tags mounted thereon, in some embodiments all tools in a drawer 330 will be equipped with identification tags. Furthermore, all tools may be equipped with visible tags, invisible tags, or a combination thereof.

As described above, the automated asset management system 100 includes two or more sensing subsystems 150. Various examples of sensing subsystems 150 are described in relation to the following figures.

Figure 4:
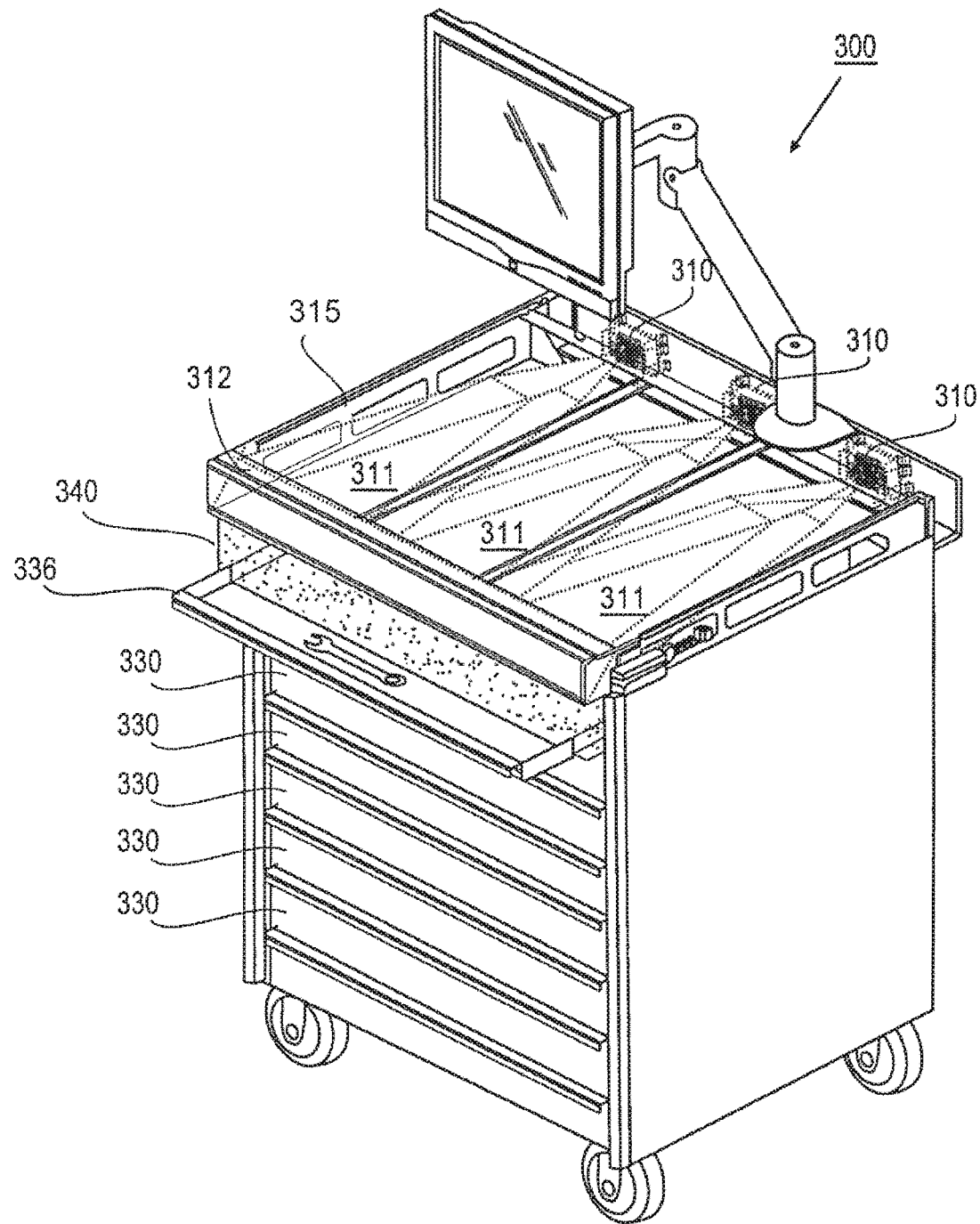
FIG. 4 shows components of an image sensing subsystem in an illustrative automated asset management system like that shown in FIG. 1C.

FIG. 4 shows a perspective view of an image-based sensing subsystem in tool storage system 300. As illustrated in FIG. 4, storage system 300 includes an imaging compartment 315 which houses an image sensing subsystem comprising three cameras 310 and a light directing device, such as a mirror 312 having a reflection surface disposed at about 45 degrees downwardly relative to a vertical surface, for directing light reflected from drawers 330 to cameras 310. The directed light, after arriving at cameras 310, allows cameras 310 to form images of drawers 330. The shaded area 340 below mirror 312 represents a viewing field of the imaging sensing subsystem of tool storage system 300. As shown at 340, the imaging subsystem scans a portion of an open drawer 336 that passes through the field of view of the imaging sensing subsystem, for example as the drawer 336 is opened and/or closed. The imaging subsystem thereby captures an image of at least that portion of the drawer 336 that was opened. Processing of the captured image is used to determine the inventory conditions of tools and/or storage locations in the portion of the drawer 336 that was opened.

While the particular set of cameras 310 and mirror 312 shown in FIG. 4 are configured to capture images of the drawers 330 by scanning the drawers 330 as they are opened and/or closed, other tool storage systems 300 may include additional or alternative set-ups enabling images of the drawers 330 to be captured when the drawers are opened, closed, or in intermediate positions. For example, systems includes movable mirrors 312, movable cameras 310, wide-angle cameras, concave or convex mirrors, or the like may be used to enable images of the drawers 330 to be captured when the drawers are closed.

In general, the image sensing subsystem captures an image of a particular drawer 330 and performs an inventory of the drawer in response to detecting movement of the particular drawer. For example, the image sensing subsystem may perform an inventory of the drawer in response to detecting that the drawer is closing or has become completely closed. In other examples, the image sensing subsystem may image the drawer both as it is opening and as it closes.

The RF sensing subsystem is generally configured to perform inventory checks of drawers having RF-based tags associated therewith. The RF-based tags may be RFID tags that are attached to or embedded within the tools. In general, the RF-based tag encodes an identifier unique to the tool, such that both the tool type (e.g., screwdriver, torque wrench, or the like) and the unique tool (e.g., a particular torque wrench, from among a plurality of torque wrenches of the model and type) can be identified from reading the RF-based tag. In particular, the information encoded in the RF-based tag is generally unique to the tool such that it can be used to distinguish between two tools that are of a same type, same model, same age, same physical appearance, etc.

The RF sensing system includes antennas mounted in or around the tool storage system 300. In general, the antennas may be mounted inside the tool storage system 300 and be configured to only detect the presence of RF-based tags that are located within the tool storage system 300 (or other defined three dimensional space). In some examples, each antenna may be mounted so as to only detect the presence of RF-based tags that are located within a particular drawer or compartment of the tool storage system 300, and different antennas may be associated with and mounted in different drawers or compartments. In further embodiments, some antennas may further be configured to detect the presence of RF-based tags in the vicinity of the tool storage system 300 even if the tags are not located within the system 300.

Each antenna is coupled to an RF transceiver that is operative to cause the antenna to emit an RF sensing signal used to excite the RF-based tags located within the vicinity of the antenna, and is operative to sense RF identification signals returned by the RF-based tags in response to emitting the RF sensing signal. One or more RF processors control the operation of the RF transceivers and process the RF identification signals received through the antennas and transceivers.

In general, the RF sensing subsystem performs an RF-based scan of the tool storage system 300 when a drawer or compartment storing tools having RF identification tags is completely closed. In particular, the RF-based scan can be performed in response to detecting that the drawer has been completely closed, or performed at any time when the drawer is completely closed. In some examples, the RF-based scan can also be triggered by a user logging into or logging out of the tool storage system 300. In general, an RF-based scan can be performed in response to similar triggers causing a camera-based inventory of the tool storage system 300 to be performed.

As part of performing an RF-based scan of the tool storage system 300, the RF processor typically needs to perform multiple sequential scans in order to ensure that all RF-based tags are detected. Specifically, the RF processor generally does not know how many RF tags it needs to detect, since one or more tags may be missing (e.g., if a tool has been checked out). Further, the RF processor cannot generally ensure that all RF tags in its vicinity have been detected in response to a single scan operation (corresponding to the emission of one RF sensing signal, and the processing of any RF identification responses received in response to the one RF sensing signal). As a result, the RF processor will generally perform ten, twenty, or more sequential RF-based scans any time an inventory of the tool storage system 300 is to be performed. Because multiple RF-based scans need to be performed, the RF scanning operation may require 10 or more seconds to be performed, resulting in significant inconvenience to users of the tool storage system 300.

As noted above, imaging-based inventory scans of the tool storage system 300 have the disadvantage that they cannot distinguish between physically identical tools. Further, RF-based scans of the tool storage system 300 may suffer from significant delay, and cannot determine if an RF tag alone (instead of an RF tag attached to its associated tool) has been returned to the drawer or storage compartment. Both scanning methodologies, when used alone, are thus susceptible to fraud (by using tool cut-out, or using RFID tag removed from tool) and inconvenience. Further, each technology may not be suitable for inventorying all tools in a particular system 300; for example, some tools may be too small to have an RF-based tag mounted thereon, or attaching of such a tag to the tool may cause the tool be unwieldy. The inventory of such tools may thus be better suited to visual-scanning methodologies even in systems 300 capable of RF-based sensing.

In order to address the deficiencies of the scanning methodologies when used individually, the tool storage system 300 advantageously uses multiple scanning methodologies in combination. For example, the tool storage system 300 may perform an inventory of objects using multiple sensing technologies in accordance with the method 500 of FIG. 5.

FIG. 5 is a flow diagram showing steps of a method 500 for performing an inventory of objects using multiple sensing technologies. The method 500 begins at step 501 with the initiation of an inventory scan. The inventory scan can be manually initiated by a local user (e.g., in response to a user request) or remote server (e.g., an asset management server), or automatically initiated based on one or more triggers. For example, the scan can be initiated in response to a user logging into or out of the tool storage system 300 (e.g., via access control device 306), access to the tool storage system 300 being detected (e.g., a drawer 330 or door opening, or closing), on a periodic basis, or the like.

In response to the scan being initiated, the tool storage system 300 may firstly perform a first inventory scan using a first sensing subsystem in step 503. For example, the system 300 may perform an image-based scan to obtain a quick (e.g., near instantaneous) determination of whether any tools are missing from the tool storage system 300 based on the image-based scan alone. Once the first scan is completed, the system may perform a second scan using a second sensing subsystem in step 505. In turn, in step 507, the tool storage system 300 determines the inventory conditions based on the sensing data obtained from the first and second scan results.

While FIG. 5 shows the scanning steps 503 and 505 as being performed sequentially, the scanning steps 503 and 505 can be performed simultaneously. However, in situations in which the scanning steps 503 and 505 are performed sequentially, results from the first scanning step 503 can advantageously be used to improve the efficiency or accuracy of the second scanning step 505. In such examples, inventory conditions can be preliminarily determined based on the results of the first scanning step 503 only, for example prior to performing the second scanning step 505. In turn, in step 507, the preliminary inventory condition determination is updated based on the results of the second scanning step 505.

For example, in an example in which the second sensing subsystem is an RF-based sensing subsystem, a result of the first inventory scan can advantageously be used to determine how many RF-based tags are expected to be in the tool storage system 300 and thereby improve the speed at which the second scanning step 505 is performed. For example, in a tool storage system 300 that usually stores 'm' tools having associated RF tags, the results of the first inventory scan are used to determine that 'n' tools having associated RF tags are missing from the tool storage system 300. The first inventory scan is then used to determine that the 'm-n' RF-based tags should be searched for using the second inventory scan (e.g., an RF-based scan).

In turn, the second inventory scan (e.g., an RF-based scan) is performed a single time (in step 505), and only needs to be repeated if less than 'm-n' RF-based tags are detected by the first iteration of the second inventory scan (e.g., the RF-based scan). Thus, the second inventory scan can be completed very efficiently—notably in situations in which only one or a few secondary scans are needed to detect all of the 'm-n' RF-based tags that are expected to be detected in the tool storage system 300.

Finally, an inventory cross-check is performed between the results of the first and second inventory scans in step 507 to ensure that the results of the two scans are consistent. Specifically, the inventory cross-check is performed to ensure that both inventory scans have identified the same tools as being present in the tool storage system 300 and have identified the same tools as being absent from the tool storage system 300. User alerts are issued if the results of the two inventory scans are not consistent with each other.

The previous example has focused on performing an RF-based scan of the tool storage system 300 following an image-based scan. In another example, a bar-code based scan of the tool storage system 300 may be performed following the image-based scan. Specifically, following the image-based scan, the result of the first inventory scan can advantageously be used to determine how many bar-code tags are expected to be in the tool storage system 300 and the approximate locations of the bar-code tags. Specifically, based on the result of the first inventory scan, the data processing system 140 may retrieve from a database stored in memory 144 data on which objects have associated bar-codes (among the objects identified by the first inventory scan as being present), and on the approximate locations within the drawers 330 of the storage locations for objects having associated bar-codes. The bar-code based scan can then be focused on the particular locations at which bar-codes are expected to be present in the drawers 330, to thereby increase the efficiency of the bar-code based scan.

In turn, the second inventory scan (e.g., a bar-code based scan) is performed in accordance with step 505. The second inventory scan can be performed more efficiently by focusing the scan on the approximate locations within the drawers 330 of the storage locations for objects having associated bar-codes and having been identified as present by the first inventory scan. Finally, the inventory cross-check is performed between the results of the first and second inventory scans in step 507 to ensure that the results of the two scans are consistent. The inventory cross-check can ensure that both inventory scans have identified the same tools as being present in the tool storage system 300 and have identified the same tools as being absent from the tool storage system 300. As above, user alerts are issued if the results of the two inventory scans are not consistent with each other.

In the example involving a first image-based inventory scan and a second bar-code based inventory scan, each inventory scan can be performed using a respective set of sensor(s). For example, the image-based inventory scan can be performed using one or more cameras, while the bar-code based inventory scan can be performed using one or more bar-code scanners. However, in some embodiments, both the image-based inventory scan and the bar-code based inventory scan can be performed using the same sensor(s), such as the same set of cameras. In such embodiments, the bar-code based inventory scan can involve locating bar-codes within images captured by the cameras, reading the located bar-codes, and identifying the tool or object associated with each read bar-code in the database. The bar-code based inventory scan can be performed on the basis of the same images that are used to perform the image-based inventory scan (e.g., images that are captured in step 503, such as images captured by the cameras 310 while a drawer 330 is closing), or on the basis of a set of images different from the images used to perform the image-based inventory scan (e.g., such as images that are captured in step 505 following the completion of step 503, or such as a second set of images captured during step 503). Similarly, in cases in which the first and second inventory scans are performed using different sets of sensors (e.g., cameras for an image-based scan, and bar-code scanners for a bar-code based scan), both sets of sensors may perform scans of the drawer(s) at the same time (e.g., both during step 503) or, alternatively, the different sets of sensors may perform scans of the drawer(s) at different respective times (e.g., one during step 503, and the other subsequently during step 505).

As noted above, the RF-based scan, bar-code based scan, or other secondary scan (e.g., tag-based scan) can be used to identify whether a specific tool (from among multiple similar tools) has been checked out or checked back in to the tool storage system 300. The RF-based and bar-code based scans can thus be used to determine how many times a particular tool has been checked out, and/or for how long a duration the particular tool has been checked out. The tool storage system 300 can thus determine whether the particular tool should be scheduled for a re-calibration or other upkeep, for example. In one example, the tool storage system 300 can thus individually track the usage of different torque wrenches and ensure that each torque wrench is recalibrated after a certain number of uses.

The inventory performed by the tool storage system 300 using multiple sensing technologies can be used to identify the individual user who received and or returned the object/tool, identify the object/tool which is being issued or returned, place a time stamp on each transaction within the system, and store item and user data in a database.

The detailed examples outlined above have focused for illustrative purposes on embodiments using image-based, RF-based, and bar-code based sensing technologies. However, the automated asset management system 100 can use other combinations of multiple sensing technologies.

For example, the sensing technologies and sensing devices used in the tool storage system 300 can include one or more of optical identification sensors, RF identification sensors, direct electronic connections to tools, weight sensors, contact switches or sensors, sonic emitter/detector pairs, magnetic induction sensing, or the like. Optical identification sensors can include sensors for detecting one dimensional bar-codes with line scanner or camera; sensors for detecting two dimensional bar-codes with camera or other imaging sensor; machine vision identification sensors with camera or other imaging sensor (using various sensing approaches, including UV, infrared (IR), visible light, or the like); and laser scanning. RF identification sensors can include RFID tags affixed to or embedded in tools (including active RFID tags and/or passive RFID tags); other RF technologies used in similar capacity, such as Ruby, Zigbee, WiFi, NFC, Bluetooth, Bluetooth lower energy (BLE), or the like. Direct electronic connection to tool can include tools that have attached or embedded connectors that plug into an identification system. Weight sensors can include scales to detect weight of individual objects or of groups of objects; and/or multiple scales used to detect weight distribution within a drawer 330 or other storage location or group of storage locations. Contact switches or sensors can include single go/no-go sensors, and/or arrays of sensors to detect shapes or outlines of objects. Sonic emitter/detector pairs can include pairings in which an emitter is mounted to the system 100 and a detector is mounted to an object, or an emitter is mounted to an object and a detector is mounted to the system 100. Magnetic induction sensing can be used, for example, to locate ferrous tools or products.

As detailed above, the access control device 306 authenticates a user's authorization for accessing storage system 300. The methods and systems used to electronically identify the user requesting access may include any one or more of the following technologies, and others not mentioned, individually or in combination: RFID proximity sensors with cards; magstripe cards and scanners; bar-code cards and scanners; common access cards and readers; biometric sensor ID systems, including facial recognition, fingerprint recognition, handwriting analysis, iris recognition, retinal scan, vein matching, voice analysis, and/or multimodal biometric systems.

A detailed example of one illustrative embodiment is provided below. In the illustrative embodiment, a physically defined, secure three dimensional object storage device is provided. The storage device is the container from which tools and/or objects are issued and/or returned. The physically defined, secure three dimensional object storage device is equipped with a processor and software operative to cause the device to communicate electronically directly or through a network with sensing devices and to obtain data from sensing devices indicating the presence or absence data of objects within the three dimensional object storage device. In the example, the sensing devices used within the three dimensional object storage device include machine vision identification devices such as cameras and RFID antennas and decoder.

The physically defined, secure three dimensional object storage device is equipped with an electronically controlled locking mechanism, along with an access control device including a processor and software means to electronically identify a user requesting access to the secure area or object storage device. The processor and software identify predetermined authorized access levels to the system, and allow or deny physical access by the user to the three dimensional space or object storage devices based on those predetermined authorized levels of access. The access control device used to electronically identify the user requesting access uses RFID proximity sensors with cards.

The physically defined, secure object storage device is equipped with drawers. At least one RFID antenna is attached inside the storage device and is configured for scanning for RFID tags within the storage device. In embodiments with multiple RFID antennas, different RFID antennas may be distributed throughout the storage device. The processor and memory storing executable software program instructions of the storage device can be connected to a computer network, and can exchange data with an administrative software application (e.g., one executed on a remote server) used to manipulate and store data and store and display information relative to the data to system users.

In operation, a user scans or approaches an access card to the access control device of the storage device. The processor of the access control device (e.g., 306) determines an access level of the user based on the access card. If the user is determined to be authorized for access to the storage device, the authorized user gains access to the object storage device. In turn, the sensing subsystems (e.g., 150) and data processing system (e.g., 140) of the storage device are activated. Light emitting diodes (LEDs) used for providing light to the system are activated, and cameras are activated. In turn, the latch of the storage system is unlocked, and the user opens one or more drawers (e.g., 330) and removes or returns one or more objects.

Note that if the user opens an imaging-only drawer (i.e., a drawer whose inventory condition is determined using imaging only, and not using RFID), then the RFID scanning subsystem need not be activated and the system can use only imaging data. Specifically, the imaging subsystem is used to optionally image the drawer as it opens and to image the drawer as it is closed (or once it is closed), and object presence and absence is determined using only the captured images.

However, if the user opens a drawer for which RFID scanning is used to determine inventory conditions, a camera-based scan of the drawer is optionally performed prior to or as the drawer opens. Additionally, the RFID sensing subsystem is activated and an RFID scan may be completed prior to opening the drawer to identify all RFID tags present in the storage system (or all RFID tags present in the drawer being opened). Specifically, an RFID scan is optionally performed prior to opening of the drawer. Additionally, a camera-based scan of the drawer is performed as the drawer closes. In response to the drawer being fully closed, or in response to the user logging out of the storage system, an RFID scan of the drawer or box is performed. The imaging subsystem thus determines and reports object presence and absence in the drawer, and the RFID subsystem scan confirms presence and absence of the specific objects in the drawer or box using the RFID tag data. Thus, imaging data and RFID tag data are combined to report presence and absence of all scanned tools, plus presence or absence of serialized items through use of RFID data. The inventory scan results are depicted on a display (e.g., 105). As the user logs out, object status is transmitted via network to a primary database and/or to an administrative application. LED lights are turned off, the lock is engaged, and cameras are set in idle state.

Additionally, the storage system can perform other actions. For example, the system can activate or initiate an RFID scan on the contents of the object storage device on a scheduled or timed basis between user accesses and thereby confirm that the contents of the storage device have not changed since the last user access.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
   performing, using an image-based sensing subsystem, an image-based scan of a plurality of storage locations for storing objects in an automated asset management system having the image-based sensing subsystem configured to sense presence or absence of the objects in the plurality of storage locations;
   determining, based on the result of the image-based scan, that an object from among multiple similar objects was removed in the plurality of storage locations;
   performing, using a radio frequency (RF)-based sensing subsystem, an RF-based scan of a plurality of storage locations for storing objects in an automated asset management system;
   determining, based on the result of the RF-based scan, that a specific object from among the multiple similar objects was returned in the plurality of storage locations; and
   tracking a number of times the specific object has been checked out based on correlating the determination from the image-based scan that an object was removed with the determination from the RF-based scan that the specific object was returned.

2. The method of claim 1, further comprising tracking, based on the sensed presence or absence of the specific object in the plurality of storage locations, a total duration during which the specific object has been checked out from the automated asset management system, and
   determining whether the specific object requires upkeep to be scheduled based on 1) the tracked number of times the specific object has been checked out and 2) the tracked total duration during which the specific object has been checked out from the automated asset management system.

3. The method of claim 1, wherein the specific object is a torque wrench, and the upkeep to be schedule for the torque wrench comprises calibration.

4. The method of claim 1, wherein the performing the RF-based scan comprises reading unique identifiers stored in RF identification (RFID) tags associated with objects present in storage locations of the asset management system.

5. The method of claim 1, further comprising:
   performing, using a first sensing subsystem, a first scan of the plurality of storage locations,
   wherein the first sensing subsystem and the RF-based sensing subsystem are configured to each sense the presence or absence of a same object in the asset management system using different respective first and second sensing modalities, and
   wherein the RF-based sensing subsystem is operative to differentiate between objects that are not differentiated by the first sensing subsystem.

6. The method of claim 5, wherein the presence or absence of objects in the plurality of storage locations is determined based on results of both the first scan and the RF-based scan performed using the different first and second sensing modalities.

7. The method of claim 5, wherein the first sensing subsystem is a camera-based sensing subsystem, and the RF-based sensing subsystem is an RF identification (RFID)-based sensing subsystem.

8. An automated asset management system comprising: a plurality of storage locations for storing objects;
   a radio frequency (RF)-based sensing subsystem configured to sense presence or absence of the objects in the plurality of storage locations of the asset management system;
   a processor; and
   a non-transitory machine readable recording medium storing program instructions which, when executed by the processor, cause the processor to:
      perform, in response to a user's access, using an RF-based sensing subsystem, a first RF-based scan of the plurality of storage locations for storing objects in the automated asset management system;
      perform based on a pre-determined schedule, using the RF-based sensing subsystem, a second RF-based scan of the plurality of storage locations
      determine, based on the results of the first and second RF-based scans, whether the results of the first and second RF-based scans for a specific object from among multiple similar objects match in the plurality of storage locations; and
      issue an alert to a user, when a mismatch of the results is determined, with the specific object from among multiple similar objects the plurality of storage locations.

9. The automated asset management system of claim 8, wherein the processor tracks a number of times the specific object has been checked out, and
   the processor determines that the specific object requires upkeep to be schedules based on 1) the tracked number of times the specific object has been checked out and 2) the tracked total duration during which the specific object has been checked out from the automated asset management system.

10. The automated asset management system of claim 8, wherein the specific object is a torque wrench, and the upkeep for the torque wrench comprises calibration.

11. The automated asset management system of claim 8, wherein the processor performs the RF-based scan by reading unique identifiers stored in RF identification (RFID) tags associated with objects present in storage locations of the asset management system.

12. The automated asset management system of claim 8, further comprising:
   a first sensing subsystem distinct from the RF-based sensing subsystem, wherein the first sensing subsystem and the RF-based sensing subsystem are configured to each sense the presence or absence of a same object in the asset management system using different respective first and second sensing modalities,
   wherein the RF-based sensing subsystem is operative to differentiate between objects that are not differentiated by the first sensing subsystem, and
   wherein the processor is further configured to perform, using the first sensing subsystem, a first scan of the plurality of storage locations.

13. The automated asset management system of claim 12, wherein the presence or absence of objects in the plurality of storage locations is determined based on results of both the first scan and the RF-based scan performed using the different first and second sensing modalities.

14. The automated asset management system of claim 12, wherein the first sensing subsystem is a camera-based sensing subsystem, and the RF-based sensing subsystem is an RF identification (RFID)-based sensing subsystem.

* * * * *